United States Patent [19]
Buchanan et al.

[11] Patent Number: 5,910,714
[45] Date of Patent: Jun. 8, 1999

[54] ELECTRICAL POWER ASSIST APPARATUS FOR A WHEELED VEHICLE

[75] Inventors: W. Darrell Buchanan; Paul MacCready, both of Monrovia, Calif.

[73] Assignee: Aerovironment Inc., Monrovia, Calif.

[21] Appl. No.: 08/842,450

[22] Filed: Apr. 23, 1997

Related U.S. Application Data

[63] Continuation of application No. 08/420,229, Apr. 11, 1995, abandoned.

[51] Int. Cl.$^6$ .............................. B62M 23/02; H02P 5/16
[52] U.S. Cl. .......................... 318/139; 318/599; 318/430; 180/206; 180/207; 477/15
[58] Field of Search ........................... 318/139, 430–434; 180/206, 2.2, 207, 222, 221, 74, 31; 477/15, 20, 109

[56] References Cited

U.S. PATENT DOCUMENTS

| | | | |
|---|---|---|---|
| 3,841,428 | 10/1974 | Bialek | 180/74 |
| 3,921,741 | 11/1975 | Garfinkle et al. | 180/34 |
| 3,921,745 | 11/1975 | McCulloch et al. | 180/33 C |
| 4,044,852 | 8/1977 | Lewis et al. | 180/68.5 |
| 4,122,907 | 10/1978 | Davidson et al. | 180/33 C |
| 4,153,853 | 5/1979 | De Villeneuve | 318/139 |
| 4,168,758 | 9/1979 | Holt | 180/206 |
| 4,221,275 | 9/1980 | Pennebaker et al. | 180/206 |
| 4,309,645 | 1/1982 | De Villeneuve | 318/139 |
| 4,364,448 | 12/1982 | Ikuma | 180/206 |
| 5,237,263 | 8/1993 | Gannon | 323/288 |
| 5,289,890 | 3/1994 | Toyoda et al. | 180/65.8 |
| 5,316,101 | 5/1994 | Gannon | 180/221 |
| 5,395,293 | 3/1995 | Matsuura et al. | 477/15 |
| 5,505,277 | 4/1996 | Suganuma et al. | 180/206 |

*Primary Examiner*—Paul Ip
*Attorney, Agent, or Firm*—Sheppard, Mullin, Richter & Hampton; James R. Brueggemann

[57] ABSTRACT

This disclosure describes an improved electrical power apparatus for assisting a rider in powering a wheeled vehicle such as a bicycle. The apparatus controllably connects a rechargeable battery to a dc motor engageable with a wheel of the vehicle in a predetermined fashion, such that the wheel is driven with a torque that varies with the vehicle's speed according to a predetermined non-uniform profile. This control advantageously can be achieved by modulating on and off a switch at a duty cycle between 0% and 100%, which is selected to provide a motor torque that decreases monotonically with the vehicle's speed, from a maximum value at zero speed to a predetermined intermediate value at a predetermined intermediate speed, and that remains at that predetermined intermediate value for speeds between the intermediate speed and a predetermined maximum speed. The apparatus further includes a charger for charging the battery using a flyback-type dc-to-dc converter.

31 Claims, 4 Drawing Sheets

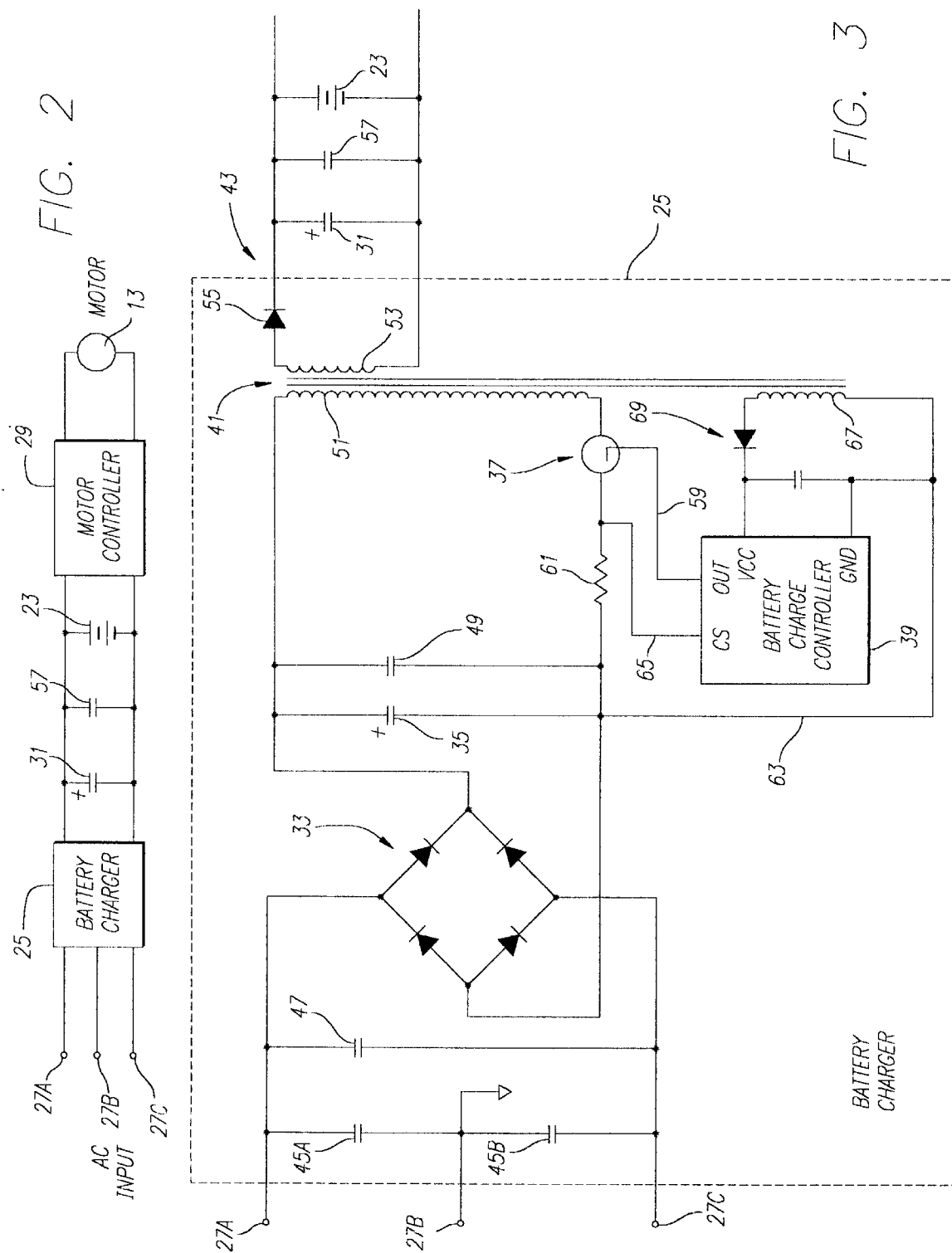

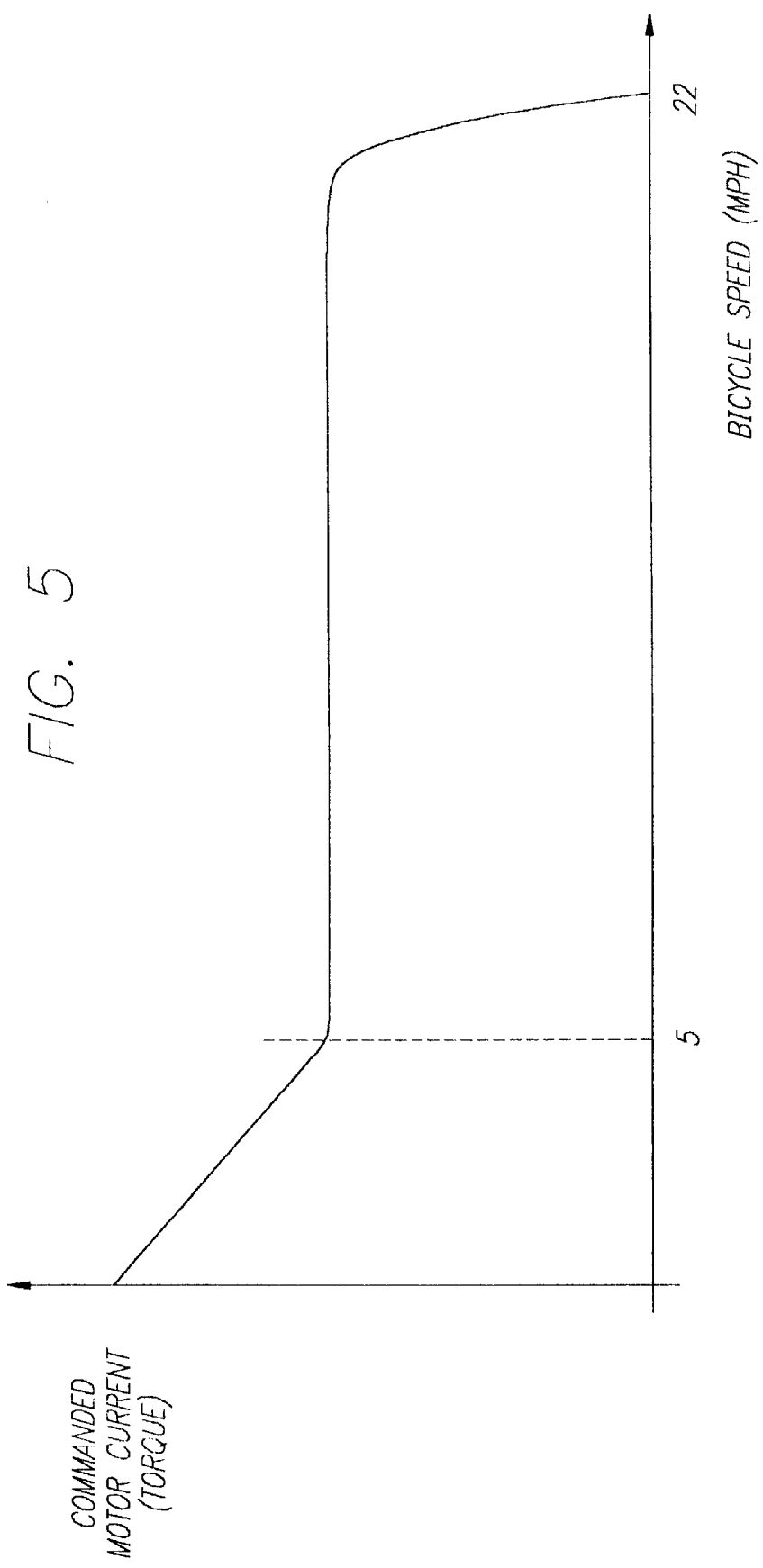

ELECTRICAL POWER ASSIST APPARATUS FOR A WHEELED VEHICLE

This application is a continuation of application Ser. No. 08/420,229, filed Apr. 11, 1995, now abandoned.

BACKGROUND OF THE INVENTION

This invention relates generally to human-powered vehicles and, more particularly, to vehicles that incorporate electrical power apparatus for assisting the rider in powering the vehicle.

Vehicles of this particular kind are becoming increasingly popular, especially in urban areas, where traffic congestion and a limited availability of parking areas make the use of automobile use inconvenient and expensive. Such vehicles typically take the form of bicycles. Such bicycles are particularly popular in developing countries, where most residents are unable to afford the rather considerable cost of purchasing and maintaining automobiles.

Typically, the electrical power apparatus of such bicycles include a rechargeable battery, a dc motor that rotates a shaft engageable with a wheel of the bicycle, an electrical switch for connecting the battery to the dc motor, and a controller for controlling the switch so that the motor drives the bicycle forward in a controlled fashion. The switch typically connects the battery to the motor either directly or through a controllably variable resistor, and the controller controllably closes the switch either continuously or at a selected duty cycle.

The controller's control scheme can take many forms. For example, in many cases, control is achieved using simply a manual throttle operated by the bicycle's rider. The rider thereby can manually control the amount of electrical current delivered to the motor, and thus the torque applied by the motor to the bicycle wheel. In other cases, control is achieved by applying electrical current to the motor only after the bicycle has reached a predetermined speed. In still other cases, control is achieved by applying electrical current to the motor in proportion to the force applied by the rider to the bicycle pedals.

In all of the cases described briefly above, the controller is configured such that motor torque varies with vehicle speed in what is considered to be a non-optimum manner or such that motor torque control requires manual intervention by the rider. There is a need for an electric-assist vehicle of this kind in which the controller operates automatically, without the need for rider intervention, to connect the battery to the motor in a way that provides a torque that varies with vehicle speed according to a predetermined optimum profile. The present invention fulfills this need.

SUMMARY OF THE INVENTION

The present invention is embodied in an electrical power apparatus for assisting a rider in powering a wheeled vehicle such as a bicycle, which automatically applies a torque to the vehicle wheel that varies with vehicle speed according to a predetermined optimum profile, without the need for any rider intervention. In particular, the apparatus includes a dc motor engageable with the wheel, a rechargeable battery, and an electrical switch for selectively connecting the battery to the dc motor. In addition, a controller is provided for controllably opening and closing the switch in a predetermined fashion, such that the motor drives the vehicle wheel with a torque that varies with the vehicle's speed according to the predetermined optimum profile.

In a more detailed feature of the invention, the controller controllably closes and opens the switch at a substantially constant frequency and at a selected duty cycle that varies between 0% and 100% according to the vehicle's speed. In particular, the controller maintains the switch closed at a duty cycle selected to provide a motor torque that is a maximum at a vehicle speed of zero, and that decreases monotonically with speed to a predetermined intermediate value at a predetermined intermediate speed, and that remains at that intermediate value for greater speeds, up to a predetermined maximum speed. This control is achieved by comparing a measurement of the actual average motor current with a measurement of the commanded average motor current, which is provided by a signal generally proportional to the duty cycle of the signal applied to the motor.

In another more detailed feature of the invention, the apparatus further includes a charger mounted on the vehicle, for receiving ac electrical power and charging the rechargeable battery. The charger can include a flyback-type dc-to-dc converter having a transformer and a power switch operable at a substantially constant cycle frequency to transfer a substantially constant amount of energy to the rechargeable battery during each cycle. The rechargeable battery, electrical switch, controller, and charger all conveniently can be carried within a single housing mounted on the vehicle. A storage capacitor is connected in parallel with the rechargeable battery, to smooth the voltage during both the charging function and the motor control function. In addition, a heat sink dissipates heat created during both the charging and motor control functions.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 2 is a simplified block diagram of an electrical power assist apparatus in accordance with the invention, suitable for use in powering the bicycle depicted in FIG. 1.

FIG. 3 is a simplified schematic diagram of a preferred embodiment of the battery charger portion of the electrical power assist apparatus of FIG. 2.

FIG. 5 is a graph showing a preferred relationship between bicycle speed and the torque delivered to the bicycle by the electrical power assist apparatus of FIG. 4.

DESCRIPTION OF THE PREFERRED EMBODIMENT

Figure 1:
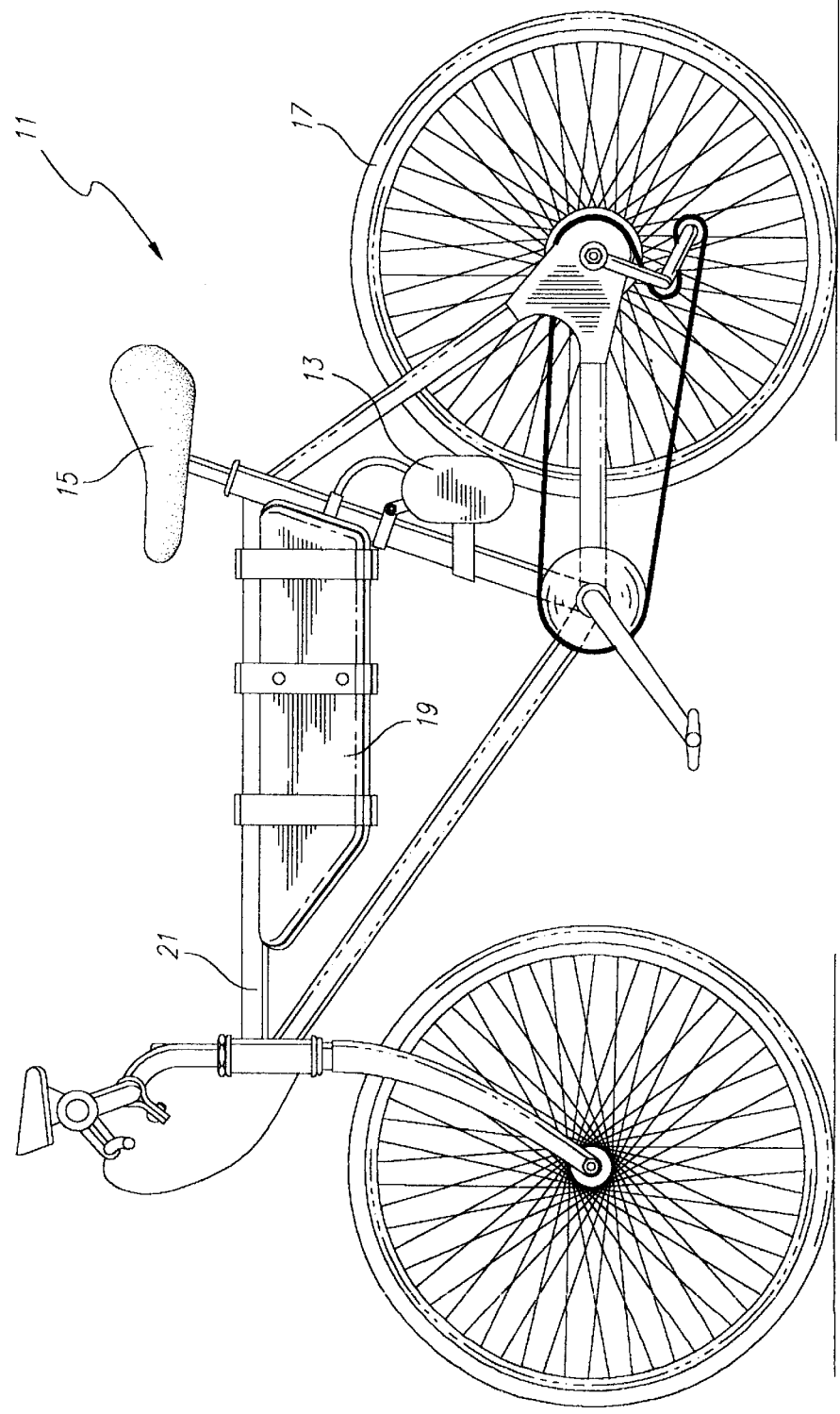
FIG. 1 is a side elevational view of a bicycle incorporating an electrical power assist apparatus in accordance with the invention, with a rechargeable battery, battery charger and dc motor controller carried within a housing suspended from the bicycle's crossbar.

With reference now to the drawings, for purposes of illustration, and particularly to FIG. 1, there is shown a bicycle 11 incorporating an electrical power apparatus for assisting a rider in powering the bicycle. The electrical power apparatus includes a dc motor 13 positioned beneath the bicycle's seat 15 and having a rotatable shaft (not shown) engageable with the bicycle's rear wheel 17. A weatherproof housing 19 is suspended from the bicycle's crossbar 21, for housing a rechargeable battery 23 (FIG. 2) and associated electronics that charges the battery and that controllably connects the battery to the dc motor 13, to assist in powering the bicycle. The battery preferably includes two 12-volt lead-acid batteries connected in series with each other. A retractable electrical power cable (not shown) also is carried within the housing, for use in coupling conventional single-phase ac power to the battery charging circuitry.

FIG. 2 is a simplified block diagram of the apparatus for charging the rechargeable battery 23 and for controllably connecting the battery to the dc motor 13, to assist in powering the bicycle 11. A battery charger 25 charges the battery using conventional single-phase ac power received via a three-conductor power cable (not shown) connected to terminals 27A, 27B, and 27C, and a motor controller 29 controllably connects the battery to the dc motor 13. A capacitor 31 is connected in parallel with the battery 23, and it is used to smooth the voltage during both the charging function and the motor control function. A heat sink (not shown) also is included, for dissipating heat produced during both the charging and motor control functions. Since the charging and motor control functions occur separately, the heat sink is sized for the function requiring the greater heat dissipation.

The battery charger 25, which is depicted in detail in FIG. 3, is configured as a flyback-type dc-to-dc converter. It controllably charges the rechargeable battery 23 using conventional single-phase ac power, which is supplied via a three-conductor power cable to terminals 27A, 27B and 27C. The charger includes a conventional diode bridge 33 and capacitor 35, for rectifying the ac power, a power transistor 37, a battery charge controller 39, and a transformer 41, for controllably switching the rectified power at a relatively high frequency of about 80 kHz, and a diode rectifier 43, for rectifying the switched power and delivering the rectified power to the battery 23.

More particularly, the line conductor and return conductor of the ac power cable are connected to terminals 27A and 27C, respectively, which connect to the two input terminals of the diode bridge 33. The ground line of the ac power cable is connected to the terminal 27B, which in turn is connected to the chassis of the housing 19. Noise-reduction capacitors 45A and 45B, having capacitances of about 2200 picofarads, are connected between the respective power terminals 27A and 27C and the ground terminal 27B. A further noise-reduction capacitor 47, having a capacitance of about 0.1 microfarads, is connected between the two power terminals 27A and 27C.

The output terminals of the diode bridge 33 deliver rectified power to the capacitor 35, which is electrolytic and preferably has a capacitance of about 220 microfarads and a voltage rating of about 200 volts. As is conventional, a non-electrolytic capacitor 49, having a similar voltage rating but a significantly lower capacitance, is connected in parallel with the electrolytic capacitor 35, for noise reduction.

The parallel-connected capacitors 35 and 49 are connected through the transistor switch 37 to a primary winding 51 of the power transformer 41. The transformer's secondary winding 53 is connected directly to the diode rectifier 43, which consists of a series-connected diode 55 and the capacitor 31. The battery 23 is connected directly across the capacitor 31, which in the preferred embodiment is electrolytic, with a capacitance of 220 microfarads and a voltage rating of 200 volts. As is conventional, a non-electrolytic capacitor 57 is connected in parallel with the electrolytic capacitor 31, for noise reduction.

As mentioned above, the battery charger 25 is configured as a flyback-type dc-to-dc converter. Thus, closing of the transistor switch 37, which is controlled by the battery charge controller 39, causes electrical current to flow through the primary winding 51 of the power transformer 41. This builds up an electromagnetic field in the transformers core, and, when the switch thereafter is opened, the field collapses, causing a current to flow in the secondary winding 53. This latter current charges the capacitor 31 of the diode rectifier 43, and thus the battery 23.

The battery charge controller 39 is configured to close and open the power transistor switch 37, via line 59, at a substantially constant frequency of 80 kHz and at a duty cycle selected to transfer a substantially constant amount of energy during each such cycle. Since the amount of energy stored in the transformer 41 at any particular time is generally proportional to the current then being conducted through its primary winding 51, each such cycle terminates when the current reaches a predetermined value. The primary winding current is measured using a set of precision current-sensing resistors 61 connected in series with the transistor switch 37, and the controller 33 measures the voltage drop across this set of resistors via lines 63 and 65. Thus, the controller outputs an appropriate control signal on line 59, to close the transistor switch 37 at regular time intervals and, during each such cycle, then opens the switch as soon as the electrical current being conducted through the primary winding is determined to have reached a predetermined threshold. This configuration also ensures that an excessive current is not conducted through the transistor switch 37.

The battery charge controller 39 conveniently can take the form of an off-the-shelf power supply controller integrated circuit UC 1842, manufactured by Unitrode. Those skilled in art can readily design the circuitry for controlling such a device and incorporating it into the charging circuitry described above.

Electrical power for the battery charge controller 39 is provided by a second primary winding 67 of the transformer 41, which functions as a bootstrap winding. The winding provides current to a diode rectifier 69, and it is sized such that the rectifier develops a voltage level appropriate for the controller. One important advantage of this means for powering the controller is that its voltage level is generally proportional to the voltage level produced by the transformer's secondary winding 53 and the diode rectifier 43. This allows the controller to regulate the secondary voltage without directly monitoring it.

The charging circuitry described above functions to charge the battery 23 at a substantially constant rate selected to be compatible with the charging characteristics of the particular battery being used. After a full charge has been achieved, the circuitry no longer provides that constant peak current and, instead, functions merely to maintain the fully charged voltage.

Figure 4:
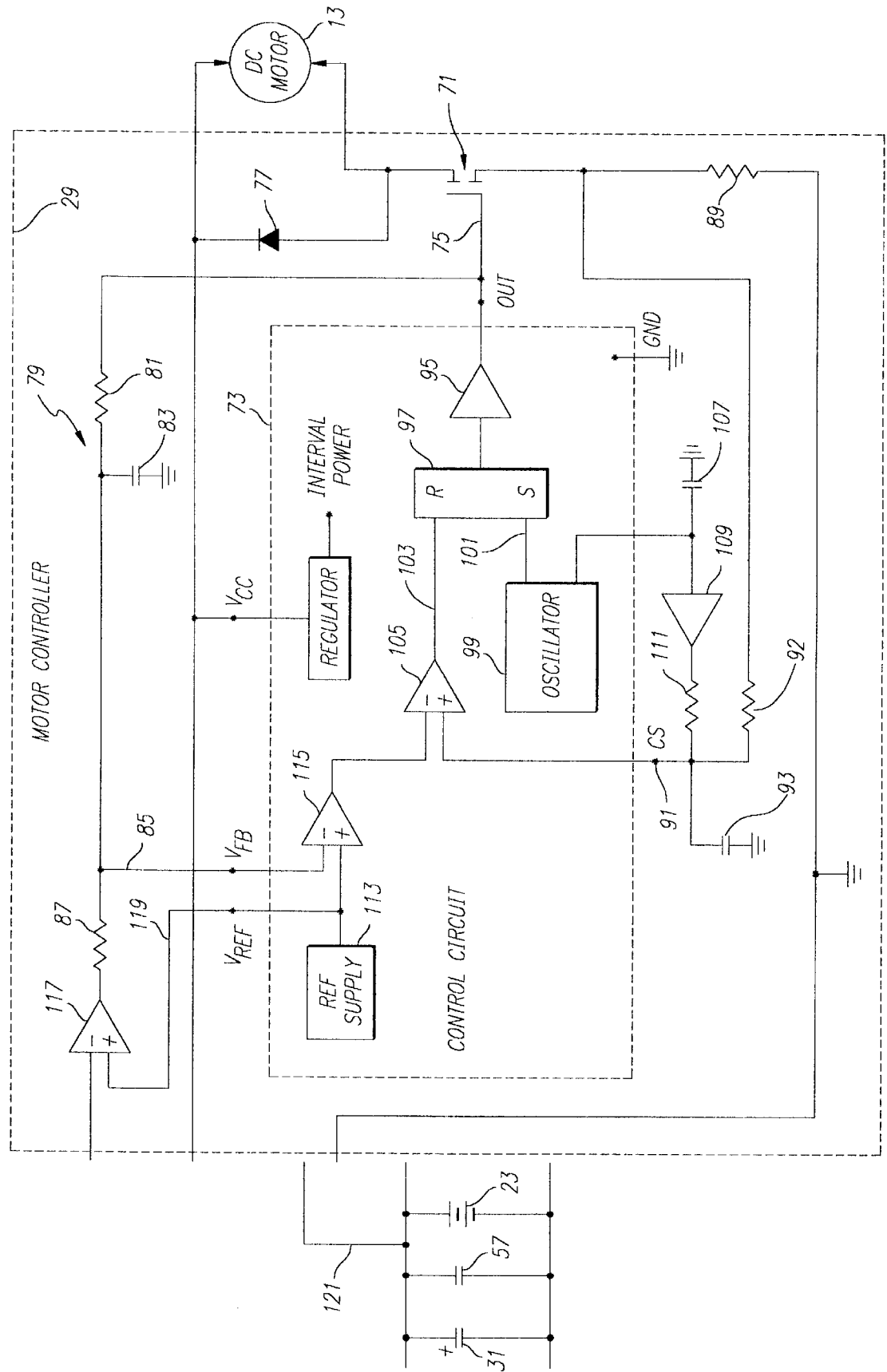
FIG. 4 is a simplified schematic diagram of a preferred embodiment of the motor controller portion of the electrical power assist apparatus of FIG. 2.

With reference now to FIG. 4, the motor control circuit 29 for controllably connecting the rechargeable battery 23 to the dc motor 13, so as to assist the rider in powering the bicycle 11, now will be described. For simplicity, certain biasing resistors are not shown. This circuit is configured such that the motor provides a torque that varies automatically with the bicycle's speed according to a prescribed, non-uniform profile that is considered to provide optimal assistance to the rider. This torque profile, which is depicted in FIG. 5, is a maximum at a speed of zero, when the rider likely is most in need of assistance, and it decreases monotonically with speed until a predetermined intermediate value is reached at a speed of about 5 miles per hour. This intermediate torque value is about one half to two thirds of the maximum value. At higher speeds, up to a maximum speed of about 22 miles per hour, the motor provides a torque that is substantially constant. At this maximum speed, the motor's back emf approximately equals the voltage of the battery 23, so no further torque can be provided.

This torque control is achieved by connecting the battery 23 to the dc motor 13 using pulse-width modulation. In particular, a transistor switch 71 is connected directly between the battery and the dc motor, and a control circuit 73 outputs a control signal on line 75, to controllably close and open the switch so as to conduct a selected average current through the motor. The control circuit 73, which conveniently can take the form of a Unitrode UC 1842 controller integrated circuit like the battery charge controller 39 (FIG. 2) described above, preferably operates at a substantially constant frequency of about 20 kHz and at a duty cycle selected to provide the desired average motor current.

At the start of each cycle, the control circuit 73 outputs an appropriate control signal on line 75 to close the transistor switch 71 and thereby conduct electrical current from the battery 23 through the winding of the dc motor 13. At a selected time during each such cycle, the control circuit terminates that signal, whereupon the transistor switch is opened and current drain from the battery also terminates. Current continues to flow through the motor winding for the remainder of the cycle, however, via a reverse-biased diode 77. While the transistor switch is closed, the current ramps upward, and while the transistor is open, the current ramps downward. The average current for the cycle, of course, is determined by the control signal's duty cycle.

The control circuit 73 selects the average current to be conducted through the motor 13, which is proportional to motor torque, based on the bicycle's instantaneous speed, using the relationship depicted in FIG. 5. A rough measure of the bicycle's speed is provided by measuring the duty cycle of the control signal supplied on line 75 to the transistor switch 71. A low-pass filter 79 that includes a resistor 81 and capacitor 83 converts this duty cycle to an equivalent dc value, for input on line 85 to the control circuit. Since the motor voltage and speed are approximately proportional to this duty cycle, it follows that the commanded current will automatically decrease as the motor speed increases. This automatically achieves the desired torque-speed relation. The sensitivity of current to voltage is determined roughly by the resistance ratio of resistor 81 to resistor 87.

The control circuit 73 then compares this commanded motor current value with a measure of the actual motor current value. This measurement of actual motor current is provided by a current-sense resistor 89 connected in series with the transistor switch 71, which is coupled to the control circuit 73 on line 91 via a low-pass filter that includes a resistor 92 and a capacitor 93. Based on the results of that comparison, the control circuit 73 adjusts the duty cycle of the control signal it supplies on line 75 to the switch 71, to bring the values into agreement. Those skilled in the art can readily configure the controller to implement this control scheme.

Several of the internal components of the control circuit 73 are depicted in FIG. 4. In particular, the control signal output on line 75 is supplied by a driver 95, which is controlled by an R-S flip-flop 97. The flip-flop is set by a oscillator 99 that outputs a 20 kHz clock pulse signal on line 101, and it is reset by a reset signal received on line 103 from a comparator 105, which compares the commanded motor current value received on line 85 with the actual motor current value received on line 91. During each 50-microsecond cycle, the comparator 105 outputs a reset pulse on line 103, to reset the flip-flop 97, when the actual motor current reaches the commanded current.

When the control circuit 73 operates the transistor switch 71 at a duty cycle greater than 50%, an instability can arise that will introduce audible subharmonics of the 20 kHz cycle frequency. This instability can be eliminated by using conventional ramp injection, in which a voltage ramp signal of selected slope is summed with the measure of actual motor current. This voltage ramp signal is produced using the oscillator 99 of the control circuit 73 and an external timing capacitor 107. A buffer amplifier 109 and resistor 111 sum this ramp signal with the measure of actual motor current supplied to the control circuit on line 91.

It will be appreciated that the battery 23 sometimes can be discharged to a point where its voltage level drops below a predetermined value such that further current draw must be reduced, to minimize the possibility of damage. This is accomplished using a reference supply 113 and error amplifier 115 that are part of the control circuit 73, in combination with an external fixed-gain amplifier 117. The reference supply 113 establishes the threshold voltage below which the current drain on the battery 23 is to be reduced. The fixed-gain amplifier 117 receives this threshold voltage as one input on line 119 and receives the actual battery voltage as its other input on line 121. The output of the amplifier is via the resistor 87 summed with the commanded motor current value that is input to the control circuit on line 85. So long as the actual battery voltage exceeds this threshold voltage, the output of the fixed-gain amplifier 117 will be saturated and near ground, thus having no effect on the commanded motor current value. However, if the actual battery voltage drops below the threshold voltage, the fixed-gain amplifier's output will rise and correspondingly reduce the commanded motor current. This is coupled through the error amplifier 115 to the comparator 105. An excessive battery discharge thereby is prevented.

It should be appreciated from the foregoing description that the present invention provides an improved electrical power apparatus carried on a wheeled vehicle such as a bicycle and incorporating a dc motor engageable with a wheel of the vehicle, for assisting a rider in powering the vehicle. This improvement is achieved by configuring a controller and switch automatically to couple a rechargeable battery to the motor at a duty cycle that varies with the vehicle's speed according to a predetermined non-uniform profile. A particularly advantageous profile provides a maximum torque at a vehicle speed of zero, decreasing monotonically with speed to a predetermined intermediate value and then remaining at that value at greater speeds, up to a predetermined maximum speed.

Although the invention has been disclosed in detail with reference only to the presently preferred embodiment, those skilled in the art will appreciate that various modifications can be made without departing from the invention. Accordingly, the invention is defined only by the following claims.

We claim:

1. An electrical power apparatus for assisting a rider in powering a wheeled vehicle, comprising:

a dc motor engageable with a wheel of the vehicle;

a rechargeable battery;

an electrical switch that selectively connects the battery to the dc motor; and a controller that controllably opens and closes the electrical switch in a predetermined fashion, such that the dc motor drives the vehicle wheel with a torque that varies with a measurement of the vehicle's speed according to a predetermined non-uniform profile that does not vary with any force applied to the vehicle by the rider.

2. An electrical power apparatus as defined in claim 1, wherein the controller controllably closes and opens the switch at a substantially constant frequency and at a selected duty cycle that varies between 0% and 100%, according to the measurement of the vehicle's speed.

3. An electrical power apparatus as defined in claim 2, wherein the controller maintains the switch closed at a duty cycle selected to provide a motor torque that decreases monotonically with the measurement of the vehicle's speed, from a maximum value at a measurement of zero speed to a predetermined intermediate value at a measurement corresponding to a predetermined intermediate speed, and that remains at the predetermined intermediate value for measurements of velocities between the intermediate speed and a predetermined maximum speed.

4. An electrical power apparatus as defined in claim 2, wherein the controller maintains the switch closed at a duty cycle selected to provide a motor torque that is a maximum at a measurement of a vehicle speed of zero.

5. An electrical power apparatus as defined in claim 1, and further comprising a charger, mounted on the vehicle, that receives ac electrical power and charges the rechargeable battery.

6. An electrical power apparatus as defined in claim 5, wherein the charger includes a flyback-type dc-to-dc converter having a transformer and a power switch operable at a substantially constant cycle frequency to transfer a substantially constant amount of energy to the rechargeable battery during each cycle.

7. An electrical power apparatus as defined in claim 5, and further comprising:
 a storage capacitor connected in parallel with the rechargeable battery; and
 a heat sink that dissipates heat both when the apparatus charges the rechargeable battery and when the apparatus supplies power to the dc motor to drive the vehicle wheel.

8. An electrical power apparatus as defined in claim 1, and further including a single housing, mounted on the vehicle, that carries the rechargeable battery, the electrical switch, and the controller.

9. An electrical power apparatus as defined in claim 1, wherein:
 the apparatus further includes means for providing a measure of the voltage of the rechargeable battery; and
 the controller controllably reduces the time period during which the electrical switch is closed whenever the measure of voltage level drops below a predetermined threshold.

10. An electrical power apparatus as defined in claim 1, wherein the controller includes:
 means for providing a measurement of the actual average electrical current being supplied to the dc motor;
 means for providing a measurement of the commanded average electrical current to be supplied to the dc motor; and
 a comparator that compares the measurement of actual current with the measurement of commanded current and produces a control signal that controllably opens and closes the electrical switch.

11. An electrically assisted bicycle having a pedal, comprising:
 a bicycle frame supported by two or more wheels;
 a dc motor engageable with a wheel of the bicycle;
 a rechargeable battery;
 an electrical switch that selectively connects the battery to the dc motor;
 a controller that controllably opens and closes the electrical switch in a predetermined fashion, such that the dc motor drives wheel of the bicycle with a torque that varies with a measurement of the bicycle's speed, according to a predetermined non-uniform profile that does not vary with a force applied to the pedal by the rider; and
 a charger that receives ac electrical power and charges the rechargeable battery.

12. An electrically assisted bicycle as defined in claim 11, wherein the controller controllably closes and opens the switch at a substantially constant frequency and at a selected duty cycle that varies between 0% and 100%, according to the measurement of the bicycle's speed.

13. An electrically assisted bicycle as defined in claim 12, wherein the controller maintains the switch closed at a duty cycle selected to provide a motor torque that is a maximum at a measurement of a bicycle speed of zero.

14. An electrically assisted bicycle as defined in claim 11, wherein the charger includes a flyback-type dc-to-dc converter having a transformer and a power switch operable at a substantially constant cycle frequency to transfer a substantially constant amount of energy to the rechargeable battery during each cycle.

15. An electrically assisted bicycle as defined in claim 11, and further comprising:
 a storage capacitor connected in parallel with the rechargeable battery; and
 a heat sink that dissipates heat both when the charger charges the rechargeable battery and when the controller supplies power to the dc motor to drive the bicycle wheel.

16. An electrically assisted bicycle as defined in claim 11, and further including a single housing, mounted on the bicycle, that carries the rechargeable battery, the electrical switch, the controller, and the charger.

17. An electrically assisted bicycle as defined in claim 11, wherein:
 the bicycle further includes means for providing a measure of the voltage of the rechargeable battery; and
 the controller controllably reduces the time period during which the electrical switch is closed when ever the measure of voltage level drops below a predetermined threshold.

18. An electrically assisted bicycle as defined in claim 11, wherein the controller includes:
 means for providing a measurement of the actual average electrical current being supplied to the dc motor;
 means for providing a measurement of the commanded average electrical current to be supplied to the dc motor; and
 a comparator that compares the measurement of actual current with the measurement of commanded current and produces a control signal that controllably opens and closes the electrical switch.

19. An electrical power apparatus for assisting a rider in powering a wheeled vehicle, comprising:
 a dc motor engageable with a wheel of the vehicle;

a rechargeable battery;

a storage capacitor connected in parallel with the rechargeable battery;

an electrical switch that selectively connects the battery to the dc motor;

a controller for controllably opening and closing the electrical switch at a substantially constant frequency and at a selected duty cycle that varies between 0% and 100%, according to a measurement of the vehicle's speed, such that the dc motor drives the vehicle wheel with a torque that is a maximum at a vehicle speed measurement of zero and that varies with the vehicle's speed measurement according to a predetermined non-uniform profile, wherein the controller includes means for providing a measurement of the actual average electrical current being supplied to the dc motor, means for providing a measurement of the commanded average electrical current to be supplied to the dc motor, and a comparator that compares the measurement of actual current with the measurement of commanded current and produces a control signal that controllably opens and closes the electrical switch;

a charger, mounted on the vehicle, that receives ac electrical power and charges the rechargeable battery;

a single housing mounted on the vehicle, that carries the rechargeable battery, the electrical switch, the controller, and the charger; and a heat sink that dissipates heat both when the apparatus charges the rechargeable battery and when the apparatus supplies power to the dc motor to drive the vehicle wheel.

20. An electrical power apparatus for assisting a rider in powering a wheeled vehicle, comprising:

a dc motor engageable with a wheel of the vehicle;

a rechargeable battery;

a controller that controls the dc motor to drive the vehicle wheel with a torque that varies with a measurement of the vehicle's speed according to a profile that decreases monotonically with increasing speed.

21. An electrical power apparatus as defined in claim 20, wherein the profile does not vary with any force applied to the vehicle by the rider.

22. An electrical power apparatus as defined in claim 20, further comprising an electrical switch that selectively connects the battery to the dc motor, wherein the controller maintains the switch closed at a duty cycle selected to provide a motor torque that decreases monotonically with the vehicle's speed, from a maximum value at zero speed to predetermined intermediate value at a predetermined intermediate speed, and that remains at the predetermined intermediate value for velocities between the intermediate speed and a predetermined maximum speed.

23. An electrical power apparatus as defined in claim 20, wherein the controller maintains the switch closed at a duty cycle selected to provide a motor torque that is a maximum at a vehicle speed of zero.

24. An electrical power apparatus for assisting a rider in powering a wheeled vehicle, comprising:

a dc motor engageable with a wheel of the vehicle;

a rechargeable battery;

a controller that controls the dc motor to drive the vehicle wheel with a torque that varies with a measurement of the vehicle's speed, according to a predetermined profile having a plurality of non-zero levels.

25. An electrical power apparatus as defined in claim 24, wherein the predetermined profile does not vary with any force applied to the vehicle by the rider.

26. An electrical power apparatus as defined in claim 25, wherein the predetermined profile decreases monotonically with increasing speed.

27. An electrical power apparatus as defined in claim 26, wherein the predetermined profile is continuous with respect to speed.

28. An electrical power apparatus as defined in claim 24, wherein the predetermined profile decreases monotonically with increasing speed.

29. An electrical power apparatus as defined in claim 24, wherein the predetermined profile is continuous with respect to speed.

30. An electrical power apparatus as defined in claim 24, further comprising an electrical switch that selectively connects the battery to the dc motor, wherein the controller maintains the switch closed at a duty cycle selected to provide a motor torque that decreases monotonically with the vehicle's speed, from a maximum value at zero speed to predetermined intermediate value at a predetermined intermediate speed, and that remains at the predetermined intermediate value for speeds between the intermediate speed and a predetermined maximum speed.

31. An electrical power apparatus as defined in claim 24, wherein the controller provides for a motor torque that is a maximum at a vehicle speed of zero.

* * * * *